Patented May 30, 1933

1,911,489

UNITED STATES PATENT OFFICE

JOSEPH C. CARLIN, OF NASHVILLE, TENNESSEE, AND CARROLL A. HOCHWALT, OF DAYTON, OHIO, ASSIGNORS TO TENNESSEE PRODUCTS CORPORATION, OF NASHVILLE, TENNESSEE, A CORPORATION OF TENNESSEE

PREPARED RESIN FROM WOOD DISTILLATION PRODUCTS

No Drawing.   Application filed January 10, 1931. Serial No. 507,992.

This invention relates to the manufacture of artificial or prepared resins formed from wood distillation products, and the production of molded articles from such prepared resins.

One of the principal objects of this invention is to produce such a resin from materials obtained in the destructive distillation of hard wood, or from the distillation of the product thereof which is known as wood tar.

Another object is to provide such an artificial resin by condensing a crude wood distillation product with an active methylene containing body.

Another object is to provide commercially satisfactory molded articles made from such a prepared resin, with unusually economical manufacture.

Other objects and advantages of the invention will be apparent from the following description and appended claims.

When hard wood is distilled in the absence of air, a substantial quantity of low boiling compounds such as methyl alcohol, acetic acid, ketones etc., are produced. Passing off with these lower boiling compounds, particularly at the temperature of destructive distillation, is a substantial quantity of a higher boiling tar-like material. This tar on standing separates out of the lower boiling point liquids as a sludge, and may be separated therefrom by sedimentation, the separated material being known as settled tar. When the settled tar is distilled, the distillation products are known as creosote oils. The lighter gravity liquid, above referred to, consisting of the above mentioned low boiling compounds, also contains in solution a quantity of tarry material known as soluble tar. On distillation of this liquid, the low boiling materials distil off, leaving the soluble tar as a residue. Hitherto these by-product tars have been employed mainly as fuels, and in the manufacture of disinfectants and the like.

I have discovered that the dehydrated hard wood tar or soluble tar produced as above described can be reacted or condensed directly with an aldehyde or methylene-containing body, to produce a resinous condensation product having valuable properties and suitable for various commercial uses. This product, since it utilizes readily obtainable, and heretofore little used by-products, is much more economical to manufacture than products made from pure materials.

In the preferred method of practising the present invention, however, these hard wood tars are subjected to distillation, to produce a limited fraction, such for example, as the fraction of dehydrated tar passing over between 195° C. and 250° C., which may be used to produce more generally usable and valuable condensation products. The condensation product obtained from these hard wood tars or distillation products of such tars, is a hard pulverizable resin, insoluble in alcohol, incompletely soluble in solvent naphtha and most hydrocarbon solvents, solid at all temperatures, but capable on heating of yielding, so as to be suitable for making moulded articles. In producing this product the distilled fraction is utilized as such, the addition of solvents or special refining of the tar oil, being unnecessary. The same is true of the crude tar referred to above; this, however, being a characteristic peculiar to this crude tar, and its distillation fractions, and not to tars produced from other original materials.

Formaldehyde or its polymers, such as tri-oxymethylene or para-formaldehyde, or other active methylene containing body, such as hexa-methylenetramine, may be used in the condensation reaction. Condensation products may be produced from admixtures of formaldehyde in substantially all proportions, in the presence of small amounts of ammonia. For example, condensation products have been produced from a mixture containing approximately 37 parts by weight of formaldehyde to 145 parts of the distillation fraction, and also from a mixture in the proportions of 375 parts formaldehyde to 145 parts of the tar product. However, it has been found that the yield of resin obtained is most satisfactory when the proportion of formaldehyde used is somewhat in excess of the estimated amount of phenolic bodies contained in the crude material used, which ordinarily will be somewhere between the two proportions specified.

The distillation fraction described above has, for convenience in nomenclature, been called "special creosote oil". As an example of the method of producing a resinous condensation product from the hard wood tar material, the following procedure is described, using the special creosote oil fraction.

The special creosote oil is added to formaldehyde (commercial 40% solution) in the proportion of about 145 parts by weight of special creosote oil to 121 parts by weight of 40% formaldehyde solution. This mixture is heated under a reflux condenser in a suitable container at from 90° C. to 100° C. for about one-half hour. Aqueous ammonia is then added in the proportion of about 3 parts by weight $NH_3$, to 145 parts by weight special creosote oil. This mixture is then heated under a reflux condenser, for a suitable period, approximately twelve hours at about 90° C. to 100° C. giving desired results. The heated mixture finally separates into two layers, one layer being of a watery composition, and the other an oily layer for ease of description termed the "initial product". At the end of this heat treatment the watery layer is decanted off, or removed mechanically in any convenient manner. The remaining oily or initial product resinous layer is about the consistency of thick molasses, viscous but not solid. This resinous layer is then further heated in a suitable open container, at about 170° C. to 180° C., until the resin solidifies to the desired hardness, and further heating appears to have no further hardening effect. This hard product is, for convenience, termed the "intermediate product". The time required for this heating varies with the length of the preliminary heating used in producing the initial product, or with the crude material used, and may be readily determined in each case by simple trial. As an example, with the special creosote oil used, and the initial product heat treatment approximately 12 hours, the time required for hardening to the intermediate product is approximately 2 hours.

The intermediate product resin thus produced is hard, pulverizable when cold, infusible, solid at all temperatures but capable of softening when heated. It is dark brown in color, and partially soluble in certain organic solvents, such as benzene and solvent naphtha. It is insoluble in water and not affected by the action of acids and alkalies. The resin has dielectric and other physical properties comparable to those of the resin known as "Bakelite". The intermediate product resin produced as described above is capable of being molded under heat and pressure to a permanent form which is substantially unaffected by temperatures below 100° C. The resin may be thus molded with or without suitable fillers, to produce various types of articles, such as electrical insulating parts, panels, handles for implements and the like. The color of this material is usually dark, but if white fillers are used the material is suitable for use with pigments, particularly black or dark colored pigments.

In manufacturing molded articles the intermediate product resin is usually mixed with a suitable filler such as wood flour, wood pulp, asbestos fiber or the like. The proportions of filler and resin used may vary widely, proportions of approximately 25% to 50% by weight of resin to 75% to 50% by weight of filler having been found to give satisfactory results. The strength of such molded products appears to increase as the proportion of resin in the molding mixture is increased. However, it has been found that satisfactory strength are molded articles of satisfactory strength are produced by using mixtures containing 50% of resin or less; while the use of more than 50% of resin materially increases the cost of the molded articles. The resin may be mixed with the filler in any convenient way, preferably on rolls, such as the differential rolls used in rubber compounding. These rolls are heated to a temperature at which the resin is in a sufficiently plastic state so that the filling material may be thoroughly mixed and incorporated with the resin. Temperatures of approximately 21° C. to 105° C. have been found suitable for heating such rolls during the mixing process.

In molding articles from the resin or from a mixture of the resin and filling materials, any suitable conventional form of mold may be used, depending on the articles to be molded. Such a mold generally comprises an outer metallic shell and an inner work chamber adapted to receive the material to be molded, and a jacket surrounding the work chamber to which a suitable heating medium is supplied. A plunger connected to a suitable operating mechanism is positioned to move within the work chamber and press the molding material therein to the desired pressure. Temperature, pressure and time of compression vary somewhat according to the product desired. Satisfactory results have been obtained by using pressures of from 2000 to 46000 lbs. per square inch, and temperatures of 120° C. to 175° C., a temperature of about 175° C. and a pressure of about 46000 lbs. per square inch having been used with good effect. The time required for the molding operation also varies somewhat, good results having been obtained using a molding time of from 1¼ to 5 minutes, the usual time being about 3 minutes. The material is allowed to cool to about 120° C. in the mold and is removed from the mold after such cooling. The resulting molded product is, for convenience, termed the "final product". This final product may, of course, be made of resin without a filler. It has also been determined that variations in the length of time of the heating which produces the initial product, seems to have no effect upon the final product,—variations of from 2 to 24 hours of such initial heating having been used without any appreciable effect on the hardening of the final product. But, as stated, these variations in the initial heating directly affect the time of heating to produce the intermediate product. These molding processes and any variations necessary for making specific articles may be carried out according to accepted practice in making molded articles.

Molded articles produced from this resin have good dielectric, tensile and compressive strength, and have good electrical and heat insulating properties. Articles molded from this resin are machinable and have a smooth surface, capable of taking a high polish. Articles thus produced are substantially unaffected by water and acids, alkalies, mineral oils or ordinary organic solvents, or by exposure to cold or by aging, and are resistant to heat up to comparatively high temperatures. Molded articles made from this resin are comparable in the above characteristics to the best molded articles on the market and, due to the use of by-products as starting materials, they are comparatively inexpensive to produce.

The distillation temperature range specified for the special creosote oil is not meant to delimit, as other fractions will function satisfactorily for certain uses of the molded article. While the methods and products herein described constitute preferred embodiments of this invention, it is to be understood that the invention is not limited to these precise methods or products, and that changes may be made therein without departing from the scope of the invention which is defined in the appended claims.

What is claimed is:

1. A resinous material comprising a condensation product of the tar produced by destructive distillation of hard wood, with a methylene containing body in the presence of small amounts of $NH_3$ without the addition of phenolic bodies, such resinous material being solid at all temperatures, substantially insoluble in water, alcohol and alkalies, incompletely soluble in solvent naphtha, and capable of softening when heated.

2. A hard substantially insoluble and infusible resinous product comprising the condensation product of a fraction of hard wood tar distilling substantially between 195° C. to 250° C., with a methylene containing body in the presence of an alkali as a condensing agent.

3. A molding composition comprising a hard solid resin made from tar produced by destructive distillation of hard wood, by condensation with a methylene containing body in the presence of an alkali condensation product, such composition being capable of being molded under heat and pressure to a substantially infusible and insoluble article of permanent form.

4. A molding composition comprising a hard substantially infusible resin substantially insoluble in water and alcohol and incompletely soluble in solvent naphtha, said resin being formed by condensation with a methylene containing body in the presence of ammonia of a fraction of hard wood tar distilling substantially between 195° C. and 250° C., and said molding composition being capable of being softened and transformed by the action of heat and pressure to a substantially infusible and insoluble molded article of permanent form.

5. The method of producing a synthetic resin which comprises directly reacting a distillation fraction of hard wood tar distilling substantially between 195° C. and 250° C. with a methylene containing body, in the presence of ammonia and without addition of phenolic bodies, to form a soft resinous initial product, and separating and heating such soft resinous initial product to form a hard substantially infusible resinous condensation product.

6. A hard substantially insoluble and infusible resinous product comprising the condensation product of crude dehydrated tar produced by destructive distillation of hard woods, with a methylene containing body.

In testimony whereof we hereto affix our signatures.

JOSEPH C. CARLIN.
CARROLL A. HOCHWALT.

CERTIFICATE OF CORRECTION.

Patent No. 1,911,489.                                                                   May 30, 1933.

JOSEPH C. CARLIN, ET AL.

It is hereby certified that error appears in the printed specification of the above numbered patent requiring correction as follows: Page 3, line 69, claim 3, for "product" read "agent"; and that the said Letters Patent should be read with this correction therein that the same may conform to the record of the case in the Patent Office.

Signed and sealed this 15th day of August, A. D. 1933.

M. J. Moore.

(Seal)                                     Acting Commissioner of Patents.